UNITED STATES PATENT OFFICE.

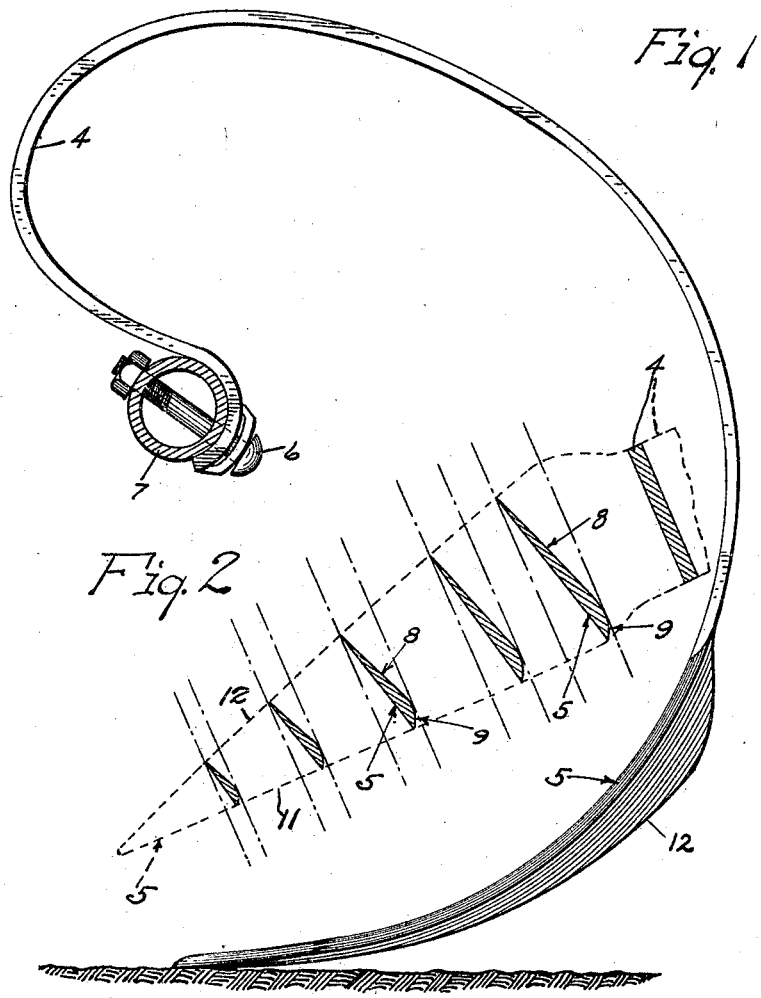

JOSEPH J. KOVAR, OF OWATONNA, MINNESOTA.

SPRING TOOTH FOR GROUNDWORKING IMPLEMENTS.

1,418,808.  Specification of Letters Patent.  Patented June 6, 1922.

Application filed November 29, 1919. Serial No. 341,428.

*To all whom it may concern:*

Be it known that I, JOSEPH J. KOVAR, a citizen of the United States, residing at Owatonna, in the county of Steele and State of Minnesota, have invented certain new and useful Improvements in Spring Teeth for Groundworking Implements; and I do hereby declare the following to be a full, clear, and exact description of the invention, such as will enable others skilled in the art to which it appertains to make and use the same.

My invention relates to spring teeth for ground-working implements.

To the above end, the invention consists of the novel devices and combinations of devices hereinafter described and defined in the claims.

In the accompanying drawings, which illustrate the invention, like characters indicate like parts throughout the several views.

Referring to the drawings:—

Fig. 1 is a land edge elevation of the improved spring tooth attached to a support;

Fig. 2 is a fragmentary dotted plan view of the pointed end portion of the tooth, together with different transverse sections taken therethrough.

The improved spring tooth is formed from a single flat metal bar and comprises an arm 4, having on one of its ends a blade 5. Both the arm 4 and blade 5 are longitudinally curved into a form where the outer end of said arm substantially overlies the forwardly projecting point of the tooth and said outer end of the arm, as shown, is secured by a bolt 6 to a tubular support 7, which may be a part of the cultivator or other implement.

The blade 5 is pointed and beveled at its land and furrow edges 11 and 12 respectively from said point to its heel and has a transverse width materially greater than the transverse width of the arm 4, and its longitudinal edges extend outward of both the furrow and land edges of said arm, the point of the blade 5 lying between lines drawn parallel to the sides of arm 4 and through the extreme outer edges of said plate. By thus locating the point of the blade 5 and extending its heel only slightly outward of the land edge 11 of the arm 4 and materially outward on the furrow edge 12 thereof, the bevel on the land edge of the arm is at a very flat angle, while the bevel on the furrow edge thereof is at a sharp angle.

The arm 4, at its junction with the heel of the blade 5, is transversely bent to tilt the furrow edge 12 of said blade downward, and the pitch thereof progressively decreases to the point of the blade 5, as shown in Fig. 1 and in the sections in Fig. 2. The bottom of the blade 5 is flat while the top thereof is transversely beveled in opposite directions, as at 8 and 9, as best shown in the sections in Fig. 2. The thickest point of the blade 5 extends substantially from the point of said blade longitudinally thereof and diverges at only a slight angle from the land edge of the blade 5, thus making the bevel 9, which extends to the land edge of the blade, steep, while the bevel 8, which extends to the furrow edge 12 of the blade, is very flat and produces a sharp cutting edge, as best shown in the sections in Fig. 2.

When the improved spring tooth is used on a cultivator, the furrow edge of the blade 5 may be turned toward the plants so as to throw the dirt toward the same, or it may be shifted on the implement, to which it is attached, to the other side of the plants so as to throw the dirt away from the same.

What I claim is:—

1. A spring tooth for ground-working implements comprising an arm having on one end a blade, said arm and blade being longitudinally bent, the longitudinal edges of the blade being beveled from the point of the tooth and the heel thereof having a greater width than that of the arm and extending outward of both of the longitudinal edges of said arm.

2. A spring tooth for ground-working implements comprising an arm having on one end a blade, said arm and blade being longitudinally bent, the longitudinal edges of the blade being beveled from the point of the tooth and the heel thereof having a greater width than that of the arm and extending outward of both of the longitudinal edges of said arm, the furrow edge of the blade being extended a greater distance outward of the arm than the land edge thereof.

3. A spring tooth for ground-working implements comprising an arm having on one end a blade, said arm and blade being longitudinally bent, the longitudinal edges of the blade being beveled from the point of the tooth and the heel thereof having a greater width than that of the arm and extending outward of both of the longitudinal edges of said arm, said blade being transversely tilted toward its furrow edge.

4. A spring tooth for ground-working implements comprising an arm having on one end a blade, said arm and blade being longitudinally bent, the longitudinal edges of the blade being beveled from the point of the tooth and the heel thereof having a greater width than that of the arm and extending outward of both of the longitudinal edges of said arm, said blade being transversely tilted toward its furrow edge, and the top of said blade being transversely beveled toward its furrow edge.

5. A spring tooth for ground-working implements comprising an arm having on one end a blade, said arm and blade being longitudinally bent, the longitudinal edges of the blade being beveled from the point of the tooth and the heel thereof having a greater width than that of the arm and extending outward of both of the longitudinal edges of said arm, said blade being transversely tilted toward its furrow edge, the top of said blade being transversely beveled toward its furrow and land edge, the bevel at its land edge relatively steep and of substantially the same width throughout its entire length.

6. A spring tooth for ground working implements, comprising an arm having a pointed blade at one end, said arm and blade being longitudinally bent and the longitudinal edges of said blade being beveled from the point thereof and the heel of the blade having a greater width than said arm and extending outward of both the longitudinal edges of said arm, the point of the blade lying between lines drawn parallel to the sides of the arm and through the extreme outer edges of said blade.

In testimony whereof I affix my signature in presence of two witnesses.

JOSEPH J. KOVAR.

Witnesses:
 CARL K. BENNETT,
 G. B. BENNETT.